(12) United States Patent
Buckland et al.

(10) Patent No.: US 6,581,129 B1
(45) Date of Patent: Jun. 17, 2003

(54) INTELLIGENT PCI/PCI-X HOST BRIDGE

(75) Inventors: Pat Allen Buckland, Austin, TX (US); Daniel Frank Moertl, Rochester, MN (US); Danny Marvin Neal, Round Rock, TX (US); Steven Mark Thurber, Austin, TX (US); Scott Michael Willenborg, Stewartville, MN (US); Curtis Carl Wollbrink, Rochester, MN (US); Adalberto Guillermo Yanes, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/414,339

(22) Filed: Oct. 7, 1999

(51) Int. Cl.[7] .......................... G06F 13/36; G06F 13/20
(52) U.S. Cl. ...................... 710/306; 710/311; 710/312; 710/313
(58) Field of Search ................. 710/306, 311, 710/313, 315, 314, 312, 305

(56) References Cited

U.S. PATENT DOCUMENTS 5,758,166 A * 5/1998 Ajanovic .................... 710/240
6,170,030 B1 * 1/2001 Bell .......................... 710/306
6,175,889 B1 * 1/2001 Olarig ........................ 710/306
6,266,731 B1 * 7/2001 Riley et al. ................. 710/306
6,389,488 B1 * 5/2002 Strongin et al. .............. 710/52

* cited by examiner

Primary Examiner—Xuan M. Thai
Assistant Examiner—Tim Vo
(74) Attorney, Agent, or Firm—Joseph P. Lally; Mark E. McBurney

(57) ABSTRACT

A PCI host bridge and an associated method of use are disclosed. The PCI host bridge includes a host bus interface, an I/O bus interface, and a PCI operation detection circuit. The host bus interface is suitable for communicating with a host bus of a data processing system and the I/O bus interface is suitable for communicating with a primary PCI bus operating in PCI-X mode. The PCI operation detection circuit is adapted to detect a PCI-X operation from the primary PCI bus that may have issued from a PCI mode adapter coupled to a secondary PCI bus. The detection circuit is further adapted to generate a modified operation for forwarding to the host bus in response to determining that the PCI-X operation may have originated from a PCI. mode adapter.

22 Claims, 4 Drawing Sheets

INTELLIGENT PCI/PCI-X HOST BRIDGE

BACKGROUND

1. Field of the Present Invention

The present invention generally relates to the field of input/output (I/O) busses and more particularly to a system for integrating PCI-X and PCI compatible devices to achieve optimal performance.

2. History of Related Art

In the field of microprocessors based data processing systems, the use of industry standard I/O busses to improve the performance and expand the capabilities of data processing systems is well known. Standardized I/O busses provide a mechanism for connecting a wide variety of peripheral devices to the host bus of a data processing system. Peripheral devices may include, for example, high speed network adapters, hard-disk controllers, graphics adapters, audio adapters, and a variety of other devices. Among the most prevalent of the industry standard I/O busses is the Peripheral Component Interface (PCI) bus. The PCI bus has evolved over the years from revision 2.0 introduced in 1992 operating at a bus frequency of 33 MHz, to revision 2.1 introduced in 1995 with a maximum bus frequency of 66 MHz, to revision 2.2 introduced in 1998 and incorporating features such as message interrupts. Complete documentation of the PCI Local Bus Specification Rev. 2.2 is available from the PCI special interest group, 2575 N. E. Kathryn #17, Hillsboro, Oreg. 97124 (website www.pcisig.com). More recently, the PCI-X Addendum to Local Bus Specification Rev. 2.2 has been proposed as a means for further improving the performance of PCI busses. The PCI-X Addendum incorporates registered transactions that improve performance by permitting a PCI-X compatible bridge or I/O adapter to make decisions on every other clock cycle. For complete PCI-X documentation, the reader is referred to the PCI-X Addendum 1.0 Specification Review Draft available from the PCI special interest group.

Maintaining compatibility with the extremely large installed base of PCI compatible devices requires PCI-X bridges to be able to operate in either PCI-X mode or PCI mode. More specifically, a PCI-X bridge must be able to accommodate any combination of PCI and PCI-X operations on either of its interfaces (i.e., PCI-to-PCI-X, PCI-to-PCI, PCI-X-to-PCI-X and PCIX-to-PCI). If any I/O device or adapter on an I/O bus is operating in PCI mode, then the bus to which the PCI device is connected must operate in PCI mode as well thereby forcing all devices on the bus to assume PCI mode operation. Thus, a single adapter or device operating in PCI mode forces every other device on the same bus to operate in PCI mode as well.

A PCI-X bridge connected between a secondary bus operating in PCI mode and a primary bus operating in PCI-X mode must convert PCI commands issued by PCI mode adapters on the secondary bus to PCI-X commands that are forwarded to the host bridge over the primary bus. The conversion of some PCI commands to PCI-X commands can, in some cases, actually result in degraded performance of the PCI mode bus. When a high performance PCI adapter is performing sequential burst reads using PCI read multiple requests, for example, a PCI mode host bridge does predictive read ahead that stores multiple lines of data in a coherent cache such that, when the requesting adapter or bridge later issues the next sequential read (or read multiple) request, the host bridge does not have to go all the way back to system memory to get the next block of sequential data. In this manner, the predictive pre-fetching of data reduces memory latency, and reduces bandwidth consumption of the improved host bus performance. Thus, in a PCI environment, the PCI read multiple operation provides a hint or suggestion to the PCI host bridge to perform pre-fetching of information because the read multiple operation, by its definition, informs the host bridge that the requesting adapter will be back for additional data in the near future. Unfortunately, when converting a PCI read multiple request to a PCI-X compatible operation, this suggestion to perform predictive read ahead is lost. More specifically, the PCI read multiple request is converted to a PCI-X split read request in the form of a byte count read operation on the PCI-X side of the bridge. When a PCI-X host bridge detects a PCI-X byte count read operation the conventional PCI-X host bridge does not execute a predictive read ahead because the host bridge assumes that the byte counts indicates the precise quantity of data required by the requesting adapter. Thus, when the PCI adapter gets back on the bus requesting additional information, the PCI-X host bridge will not have pre-fetched any additional data and will, therefore, be required to access system memory resulting in potentially significant degradation of performance caused by excessive memory latency times. Therefore, it is desirable to implement a solution by which a PCI-X host bridge would recognize that certain PCI-X operations may have issued or originated from a PCI adapter performing a read multiple request and it would be further desirable if the bridge accommodated this possibility by acting in a manner as if it had received a multiple read request operation.

SUMMARY OF THE INVENTION

The above identified problems are in large part addressed by a PCI host bridge capable of determining whether a PCI-X operation might have originated as a PCI mode operation and, if so, generating a modified operation that requests more data than the PCI-X operation. The "excess" data fetched by the modified operation is then saved in anticipation of a subsequent request for the saved data. In this manner, the PCI host bridge improves system performance by reducing the time required to satisfy a read multiple request issued by a PCI mode adapter and by reducing host bus bandwidth consumption.

Broadly speaking, the invention contemplates a PCI host bridge and an associated I/O subsystem and method of operation. The PCI host bridge includes a host bus interface, an I/O bus interface, and a PCI mode operation detection circuit. The host bus interface is suitable, for communicating with a host bus of a data processing system and the I/O bus interface is suitable for communicating with a primary PCI bus operating in PCI-X mode. The PCI mode operation detection circuit is adapted to detect a PCI-X operation from the primary PCI bus that may have issued from a PCI mode adapter coupled to a secondary PCI bus. The detection circuit is further adapted to generate a modified operation for forwarding to the host bus in response to determining that the PCI-X operation may have originated from a PCI mode adapter. In the preferred embodiment, the quantity of data requested by the modified operation and the quantity of data requested by the PCI-X operation differ. In one embodiment, the quantity of data requested by the modified operation exceeds the quantity of data requested by the PCI-X operation such that the modified operation results in a speculative pre-fetch of data. The PCI host bridge may further include storage buffers suitable for storing the speculatively pre-fetched data in anticipation of a subsequent request for the stored data. In one embodiment, the PCI-X operation comprises a request for data with a specified byte count. The specified byte count is equal to the number of bytes in a cache line of the data processing system. In one embodiment, the modified operation comprises a request for data with a byte count equal to a multiple of the byte count of the PCI-X operation. The PCI host bridge may further include a byte count register. In this embodiment, the specified byte count for detecting operations that may have issued from a PCI mode adapter equals the value stored in the byte count register. The PCI host bridge may further include a byte count multiplier register. In this embodiment, the byte count of the modified operation is determined by multiplying the value stored in the byte count register by the value stored in the multiplier.

BRIEF DESCRIPTION OF THE DRAWINGS

Other objects and advantages of the invention will become apparent upon reading the following detailed description and upon reference to the accompanying drawings in which.

Figure 1:
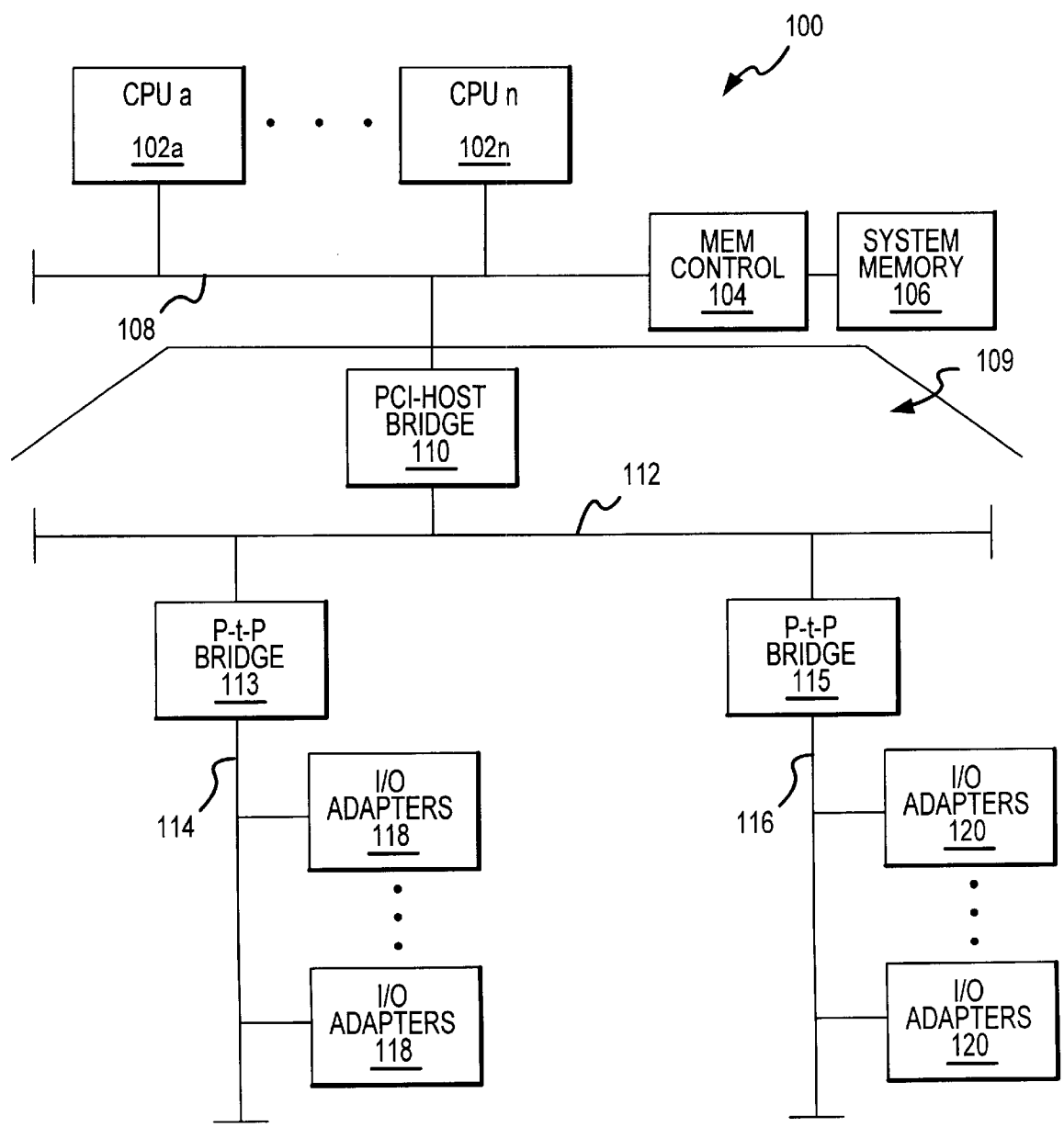
FIG. 1 is a simplified block diagram of a data processing system according to an embodiment of the invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Turning now to the drawings, FIG. 1 is a simplified block diagram representation of a data processing system 100 according to one embodiment of the present invention. The depicted embodiment of data processing system 100 includes one or more central processing units (CPU) 102a ... 102n (generically or collectively referred to herein as processor(s) 102) coupled to a host bus 108. The invention is not intended to imply any particular implementation for processors 102 and any of a variety of commercial distributed processor architecture families are suitable for use with the invention as contemplated herein. Thus, processors 102 may comprise processors such as the RS/6000 family of processors available from International Business Machines Corporation, PowerPC processors, 68000 family processors from Motorola, as well as x86 compatible processors available from a number of sources or any of a variety of other suitable processors. Each processor 102 has access to a system memory 106 via a memory controller 104 coupled to host bus 108. Although the depicted embodiment indicates memory controller 104 as a discreet unit, it will be appreciated that the function of memory controller 104 may be integrated into each of the processors 102 or integrated into system memory 106. System 100 further includes an I/O subsystem 109 suitable for coupling to host bus 108. I/O subsystem 109 includes a PCI host bridge 110 a primary PCI bus 112 and secondary busses and adapters that communicate with host bus 108 via PCI host bridge 110.

A PCI bus, such as primary PCI bus 112, operating at 33 MHz can accommodate a maximum of 10 loads without jeopardizing performance. As a rule of thumb, each integrated device or adapter represents approximately one load while each slotted device or adapter represents approximately two loads. Considering that the PCI host bridge 110 consumes one load, it will be appreciated that a maximum of four slots may be coupled to a PCI bus. To expand the capabilities of computer system 100 beyond more than four slotted devices, PCI-to PCI (P-t-P) bridges are attached to primary PCI bus 112 to provide one or more secondary busses. In the embodiment depicted in FIG. 1, P-t-P bridge 113 is coupled between primary PCI bus 112 and a first secondary PCI bus 114 while P-t-P bridge 115 is coupled between primary PCI bus 112 and a second secondary PCI bus 116. A first set of I/O adapters 118 is connected to first secondary PCI bus 114 while a second set of I/O adapters 120 is connected to second secondary PCI bus 116.

As indicated previously, if any of the first set of I/O adapters 118 are PCI adapters rather than PCI-X adapters, all I/O adapters 118 must conform to the PCI standard and the secondary bus interface of P-t-P bridge 113 must interpret PCI operations. Similarly, if any of the second set of I/O adapters 120 on second secondary PCI bus 116 is a PCI device, secondary bus 116 must operate in PCI mode and the secondary bus interface of P-t-P bridge 115 must operate in PCI mode. If PCI host bridge 110, P-t-P 113, and P-t-P 115, are all PCI-X capable bridges, then primary PCI bus 112 will operate in PCI-X mode. If one or more I/O adapters 120 on second secondary PCI bus 116 are PCI devices, then P-t-P bridge 115 converts PCI commands received from its subordinate PCI adapters to PCI-X commands on primary PCI bus 112. Thus, it will be appreciated that PCI host bridge 110 is insulated from the implementation specifics of individual I/O adapters 118 and 120 on secondary busses 114 and 116. In other words, PCI host bridge. 110 will not be able to determine whether an operation received from primary PCI bus 112 issued as PCI-X operation or as a PCI mode operation that was converted by a P-t-P bridge Under certain circumstances, however, it is advantageous if PCI host bridge 110 is able to recognize that an operation appearing as a PCI-X operation on primary PCI bus 112 may have originated from an I/O adapter 120 (or 118) that is not PCI-X compatible.

Figure 2:
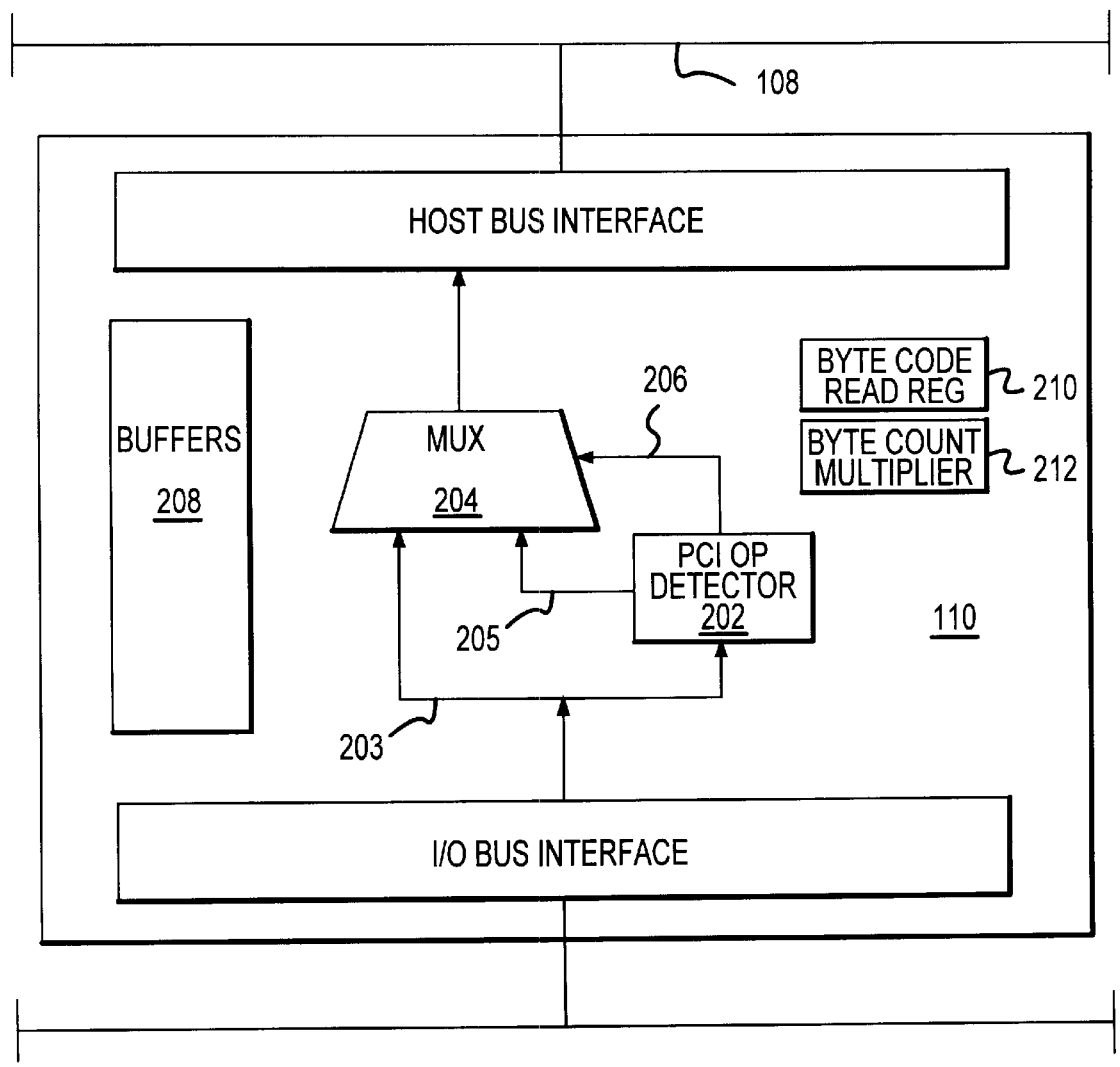
FIG. 2 is a conceptualized block diagram of a PCI host bridge according to an embodiment of the invention.

Turning now to FIG. 2, a conceptualized block diagram of an embodiment of PCI host bridge 110 according to an embodiment of the present invention is presented. As contemplated herein, PCI host bridge 110 is adapted to recognize that certain PCI-X operations may have originated from a PCI mode device and interprets the commands correspondingly. More specifically, one embodiment of the invention incorporates a PCI operation detection circuit 202 monitoring a PCI-X operation 203 from primary PCI bus 112. PCI operation detection circuit 202 recognizes certain PCI-X commands as possibly originating from a PCI device, and in response thereto, generates a modified operation 205. The modified operation preferably has the effect of fetching more data from host bus 108 than the original PCI-X operation. In one embodiment, modified operation 205 produced by PCI operation detection circuit 202 is routed to a multiplexer 204 along with the original PCI-X operation 203. PCI operation detection circuit 202 further generates a select signal 206 that is provided to multiplexer 204 to select between PCI-X operation 203 and modified operation 205 for forwarding to host bus 108. In one embodiment, PCI operation detection circuit 202 is adapted to select modified operation 205 if PCI-X operation 203 is recognized as an operation that may have originated from a PCI device. In one embodiment, select signal 206 selects modified operation 205 generated by PCI operation detection circuit 202 when original operation 203 is recognized as a request for data, such as a byte count read operation, with a byte count equal to the number of bytes in a cache line of computer system 100. In this embodiment, PCI operation detection circuit 202 operates as a specialized instruction decoder that activates a select signal upon detecting a PCI-X operation with specified characteristics.

Because a PCI read multiple operation is translated into a PCI-X split read request with a byte count of one cache line by P-t-P bridge 115 (or 113), PCI operation detection circuit 202 recognizes that a PCI-X operation requesting data with a byte count of one cache line may have originated from a PCI adapter. If the byte count for a PCI-X operation 203 requesting data is equal to the size of the system's cache line, one embodiment of PCI operation detection circuit 202 produces a modified operation 205 with a byte count equal a multiple of the byte count of PCI-X operation 203 (i.e., the modified operation byte count is equal to two or more cache lines of data). By fetching multiple cache lines in those situations where PCI-X operation 203 requests a single cache line, PCI host bridge 110 is adapted to anticipate situations in which PCIX operation 203 requesting a single cache line originated with a PCI adapter or device that requested multiple cache lines via a PCI read multiple request. By fetching multiple cache lines, PCI host bridge 110 is capable of reducing memory latency in those situations where a PCI mode adapter is issuing a read multiple requests. In the absence of a facility to fetch multiple cache lines under specified circumstances as disclosed herein, a PCI-X compliant host bridge would treat every read multiple request that is translated to a PCI-X split read request by an intermediate bridge as a request for a single cache line. When the requesting PCI adapter subsequently requested the second, third, or additional cache lines, PCI host bridge 110 would have to re-arbitrate for control of host bus 108 to fetch the appropriate data from memory. By speculatively anticipating that a byte count read operation specifying a byte count equal to a cache line may have originated from a PCI adapter requesting multiple cache lines and, in response, fetching multiple cache lines from memory, PCI host bridge 110 improves performance by reducing the number of times PCI host bridge 110 is required to access system memory or cache memory via host bus 108 thereby reducing bandwidth consumption of host bus 108 and by reducing the time required to complete the subsequently issued read (or read multiple) requests from the PCI mode adapter.

PCI host bridge 110 preferably further includes sufficient buffers 208 to store data fetched via host bus 108. Consider, as an example, a PCI mode adapter 120 operating in a system with a 256 byte cache line. If a PCI mode I/O adapter 120 issues a read multiple request, the read multiple operation is translated in P-t-P bridge 115 to a PCI-X byte count read operation with a byte count of 256 that is forwarded to PCI host bridge 110 via primary PCI bus 112. PCI host bridge 110, according to the present invention, recognizes that the PCI-X operation may have originated with a PCI adapter and increases the byte count associated with the operation to speculatively pre-fetch more data than is indicated by the operation's byte count in anticipation of a soon-to-follow request for the additional data. In one embodiment, PCI host bridge 110 achieves this speculative pre-fetching by doubling the byte count of an operation that requests a single cache line. Thus, a byte count read operation with a byte count of 256 bytes in a system with a 256 byte cache line would be translated within PCI host bridge 110 to a byte count read operation with a byte count of 512. PCI host bridge 110 would then fetch 512 bytes via host bus 108 of which 256 bytes would be used to complete the pending read request while the remaining 256 speculatively prefetched data would be stored in buffers 208. In the preferred embodiment, buffers 208 comprise a cache coherent storage facility. A subsequent read request (or read multiple request) would eventually issue from I/0 adapter 120. This subsequently issued request would be translated in P-t-P bridge 115 to a subsequent byte count read operation and forwarded to PCI host bridge 110. Because PCI host bridge 110 had originally requested multiple cache lines, however, the subsequent byte count read operation would be satisfied by data stored in buffers 208 of PCI host bridge 110 without requiring a second access of host bus 108. In the preferred embodiment, the byte count that triggers the translation of a byte read operation is stored in a programmable byte count register 210 of PCI host bridge 110 to provide sufficient flexibility to accommodate any cache line size. In one embodiment, further control over the modification of incoming byte count read operations that occurs in PCI operation detection circuit 202 is achieved by including a byte count multiplier register 212 that controls, along with byte count register 210, the number of bytes that will be requested in the modified byte count read operation. If byte count multiplier register 212 is programmed with a 2, for example, and byte count register 210 is programmed with 256 to indicate a 256 byte cache line, a byte count read operation with a byte count of 256 would be modified to a 512 byte count read operation. If multiplier 212 is programmed with a 3, the modified operation would fetch 768 bytes, and so forth. Multiplier 212 enables flexible optimization of the number of bytes fetched for each appropriate byte count read operation. It will be appreciated, that because of the limited size of buffer 208 and the speculative nature of the data pre-fetch executed as described herein, it is desirable to avoid "over speculation" by consuming the entire buffer 208 with data that may not be required to complete the original operation.

Figure 3:
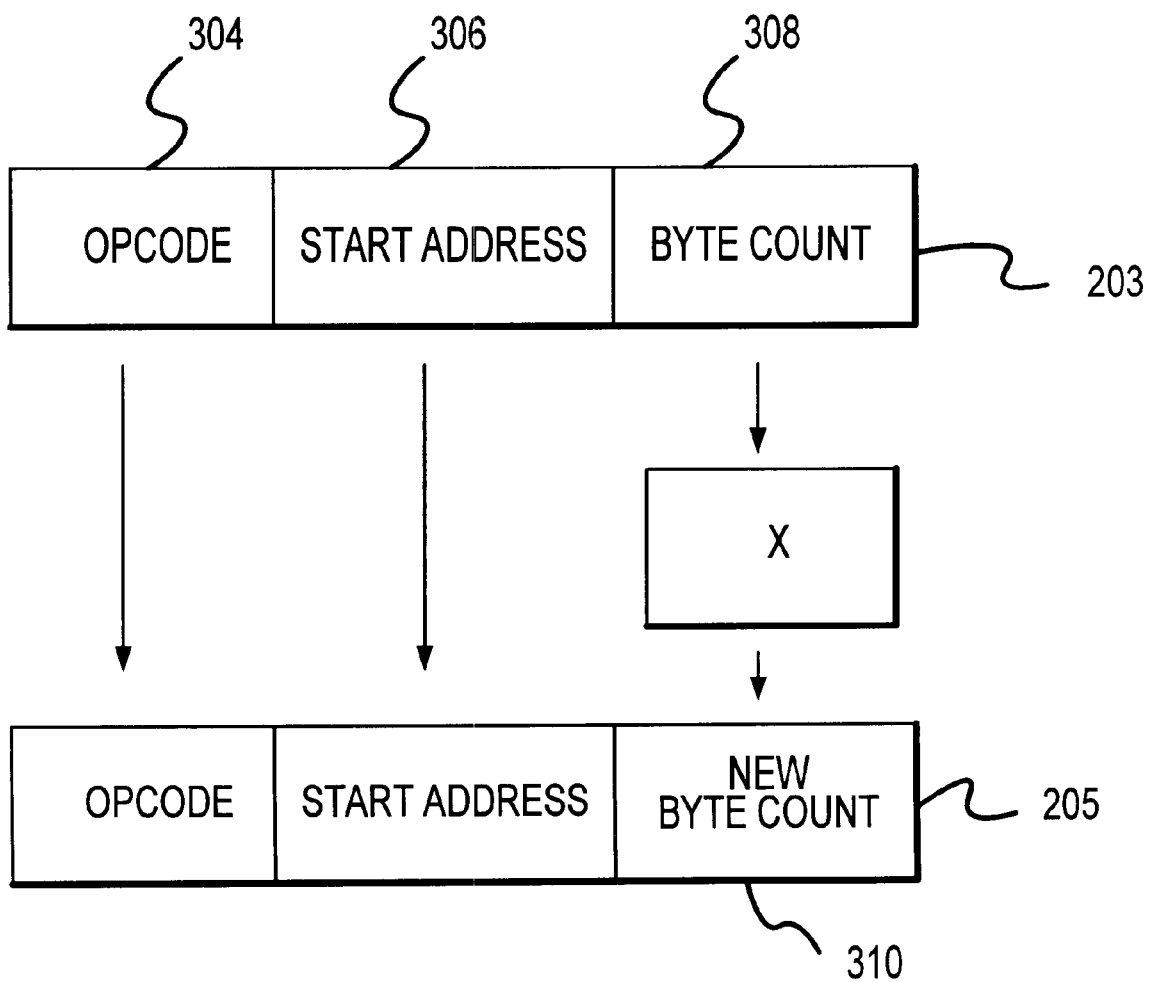
FIG. 3 illustrates an example of the operation of the PCI host bridge of FIG. 2.

Turning now to FIG. 3, an illustration of the operation of PCI operation detection circuit 202 according to one embodiment is presented. A PCI-X operation 203 is received by PCI host bridge 110 from primary PCI bus 112. In the depicted embodiment, incoming operation 203 includes an op-code field 304, a start address field 306 and a byte count field 308. If op-code field 304 is interpreted by PCI operation detect circuit 202 as a request for data (such as a PCI-X split read request in the form of a byte count read operation) and the byte count in byte count field 308 is equal to the size of the system cache line, PCI operation detect circuit 202 generates a modified operation 205. In the depicted embodiment, the op-code and start address of modified operation 205 are the same as the op-code and starting address of PCI-X operation 203, but the byte count field 310 of the modified operation 205 is a multiple of the byte count stored in byte count field 308 of PCI-X operation 203. In one embodiment, the byte count in byte count field 308 of PCI-X operation 203 that triggers the modification of PCI-X operation 203 is stored in byte count register 210 of primary host bridge 110 and the multiplier used to generate the new byte count in modified operation 205 is stored in byte count multiplier register 212. Byte count read register 210 and byte count multiplier register 212 provide flexibility to primary host bridge 110 to facilitate integration of primary host bridge 110 into a variety of systems. Byte count multiplier 212 provides the ability to optimize the number of cache that are retrieved and responds to each incoming operation that triggers PCI operation detect circuit 202.

Figure 4:
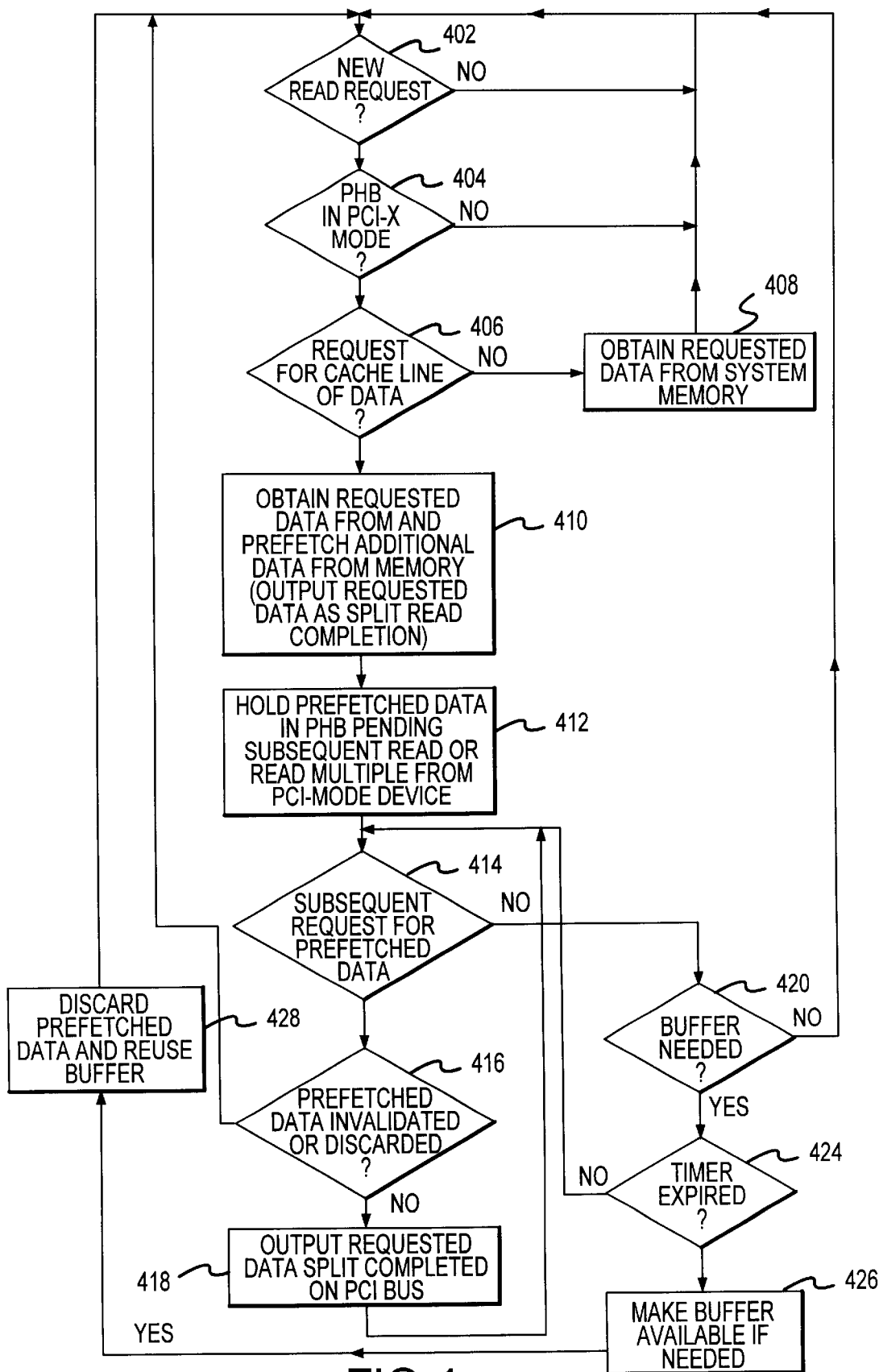
FIG. 4 is a flow diagram illustrating the operation of PCI host bridge of FIG. 2.

Turning now to FIG. 4, a flow diagram of the operation of PCI host bridge 110 is presented. Upon detecting a new read request (step 402), a determination is made on whether PCI host bridge 110 is operating in PCI-X mode (step 404). If PCI host bridge 110 is operating in PCI-X mode, the read request is examined to determine whether the request is for a cache line of data in step 406. If the read request is for a cache line of data PCI operation detect circuit 202 generates a modified operation as discussed previously. In the embodiment of FIG. 4, the modification of the incoming operation is achieved by obtaining the requested data from system memory and speculatively pre-fetching additional data from memory in step 410. The requested data is output from PCI host bridge 110 as a split/read completion operation on primary PCI bus 112. The additional pre-fetched data (step 412) is held in buffers 208 of primary host bridge 110 in the read request originated from a PCI mode that will issue a subsequent read request. If, in step 406, it is determined that the request is not for a cache line of data, the requested data is obtained from system memory in step 408 and output from PCI host bridge 110 as split/read completion data on primary PCI bus 112.

Returning to the situation in which the read request was for a cache line of data and additional pre-fetched data has been stored in PCI host bridge 208 in step 412, PCI host bridge 110 remains in this state for this data fetch until a subsequent read request is detected in step in 414. If the subsequently detected read request is for the data that has been pre-fetched and stored in buffers 208, a determination is made in step 416 whether the pre-fetched data has been invalidated or discarded. Preferably this determination is made through the use of status bit and tag information associated with each buffer entry in a manner that will be familiar to those knowledgeable in the field cache memory systems, rename buffers, and a variety of other similar applications. If the prefetched data has not been invalidated or discarded, the subsequent read request is satisfied by outputting (step 418) the requested data as a split completion operation on primary PCI bus 112 and the process returns to step 414. If pre-fetched data has been invalidated or discarded in step 416, the process returns to step 402. By pre-fetching additional data, the subsequent read request is satisfied without requiring access of host bus 108 or system memory 106. Because the latency associated with a system memory access can be significant, the elimination of this step provides a significant benefit to system 100 and PCI host bridge 110. If the subsequent read request detected in step in 414 is determined not to be for data that was prefetched and stored in buffers 208, a determination is made in step 420 whether buffers 208 occupied by the previously pre-fetched data are needed to service the pending read request. If the pending read request does require buffers occupied by the previously pre-fetched data, a 5 timer is checked in step 424 to determine if the previously pre-fetched data has been saved in buffers 208 for a duration longer than a specified interval. If the data has been stored in the buffers 208 for longer then a specified duration, the buffer is made available in step 426 and the pre-fetched data can be discarded (step 428) and the process returns to step 402. If the buffer is not needed in step 420, the process returns to step 402. If timer is not expired in step 424, the process returns to step 414. Utilizing the method outlined in FIG. 4, the invention contemplates speculatively pre-fetching data in response to operations that may have originated with devices or adapters operating in PCI mode to reduce traffic on host bus 108. If the speculatively pre-fetched data interferes with a subsequent read request or exceeds a specified time interval, the buffers occupied by the speculatively pre-fetched data are freed up for subsequent operations.

It will be apparent to those skilled in the art having the benefit of this disclosure that the present invention contemplates improved PCI subsystem performance by modifying specified PCI-X operations to speculatively prefetch data in anticipation of a subsequent request for the speculatively prefetched data by a PCI mode adapter issuing read multiple requests. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. An I/O subsystem suitable for coupling to a host bus of a data processing system, comprising:

a PCI host bridge coupled between the host bus and a primary PCI bus, wherein the primary PCI bus operates in PCI-X mode;

a first P-t-P bridge coupled between the primary PCI bus and a first secondary PCI bus;

a PCI mode adapter connected to the first secondary PCI bus such that the first secondary bus operates in PCI mode; and wherein the PCI host bridge is configured to generate a modified operation in response to receiving a PCI-X operation if the PCI-X operation may have issued from the PCI mode adapter.

2. The subsystem of claim 1, wherein data fetched by the PCI-X mode operation and data fetched by the modified operation differ.

3. The subsystem of claim 1, wherein the modified operation is forwarded to the host bus if the PCI-X operation comprises a request for a cache line of data.

4. The subsystem of claim 1, wherein the PCI host bridge further comprises a byte count register, and wherein the modified operation is forwarded to the host bus if the PCI-X operation comprises a request for data and the number of bytes of data requested is equal to the value of the byte count register.

5. The subsystem of claim 2, wherein the data fetched by the modified operation exceeds the data fetched by the PCI-X operation.

6. The subsystem of claim 3, wherein the modified operation comprises a request for multiple cache lines of data.

7. The subsystem of claim 4, wherein the PCI host bridge further comprises a byte count multiplier register, wherein the modified operation comprises a request for data with a byte count equal to the byte count of the PCI-X operation multiplied by the value stored in the byte count multiplier register.

8. The subsystem of claim 5, wherein the PCI host bridge further comprises buffers, wherein the data fetched by the modified operation in excess of the data fetched by the PCI-X operation is stored in the buffers in anticipation of a subsequent request for data.

9. A PCI host bridge, comprising:

a host bus interface for communicating with a host bus of a data processing system;

a peripheral bus interface suitable for communicating with a primary PCI bus operating in PCI-X mode; and a PCI operation detection circuit configured to detect a PCI-X operation from the primary PCI bus that may have issued from a PCI mode adapter coupled to a secondary PCI bus, and, responsive thereto, generating a modified operation for forwarding to the host bus.

10. The PCI host bridge, of claim 9, wherein the quantity of data requested by the modified operation and the quantity of data requested by the PCI-X operation differ.

11. The PCI host bridge of claim 9, wherein the PCI-X operation comprises a request for data with a specified byte count.

12. The PCI host bridge of claim 9, further comprising a byte count register, wherein the PCI host bridge forwards the modified operation to the host bus if the PCI-X operation comprises a request for data with a byte count equal to the value stored in the byte count register.

13. The PCI host bridge of claim 10, wherein the quantity of data requested by the modified operation exceeds the quantity of data requested by the PCI-X operation.

14. The PCI host bridge of claim 11, wherein the specified byte count comprises the number of bytes in a cache line of the data processing system.

15. The PCI host bridge of claim 11, wherein the modified operation comprises a request for data with a byte count equal to a multiple of the byte count of the PCI-X operation.

16. The PCI host bridge of claim 12, further comprising a byte count multiplier register, wherein a byte count of the modified operation equals the byte count of the PCI-X operation multiplied by the value stored in the byte count register.

17. The PCI host bridge of claim 13, further comprising storage buffers, wherein the PCI host bridge is adapted to store the quantity of data in excess of the quantity of data requested by the PCI-X operation in the storage buffers in anticipation of a subsequent request for the stored data.

18. A method comprising:

receiving a PCI-X mode operation; and responsive to determining that the PCI-X mode operation may have issued from a PCI mode adapter, generating a modified operation wherein the quantity of data requested by the modified operation and the quantity of data requested by the PCI-X mode operation differ; and fetching the determined quantity of data from memory.

19. The method of claim 18, wherein the quantity of data requested by the modified operation exceeds the quantity of data of the PCI-X operation.

20. The PCI host bridge of claim 19, further comprising storing data fetched from memory in excess of the quantity requested by the PCI-X operation in storage buffers in anticipation of a subsequent request for the stored data.

21. The PCI host bridge of claim 20, wherein the determining comprises determining whether the PCI-X operation is a request for a cache line of data.

22. The PCI host bridge of claim 21, wherein the generating comprises generating a modified operation requesting a quantity of data equal to a multiple of the quantity of data requested by the PCI-X operation.

* * * * *